UNITED STATES PATENT OFFICE.

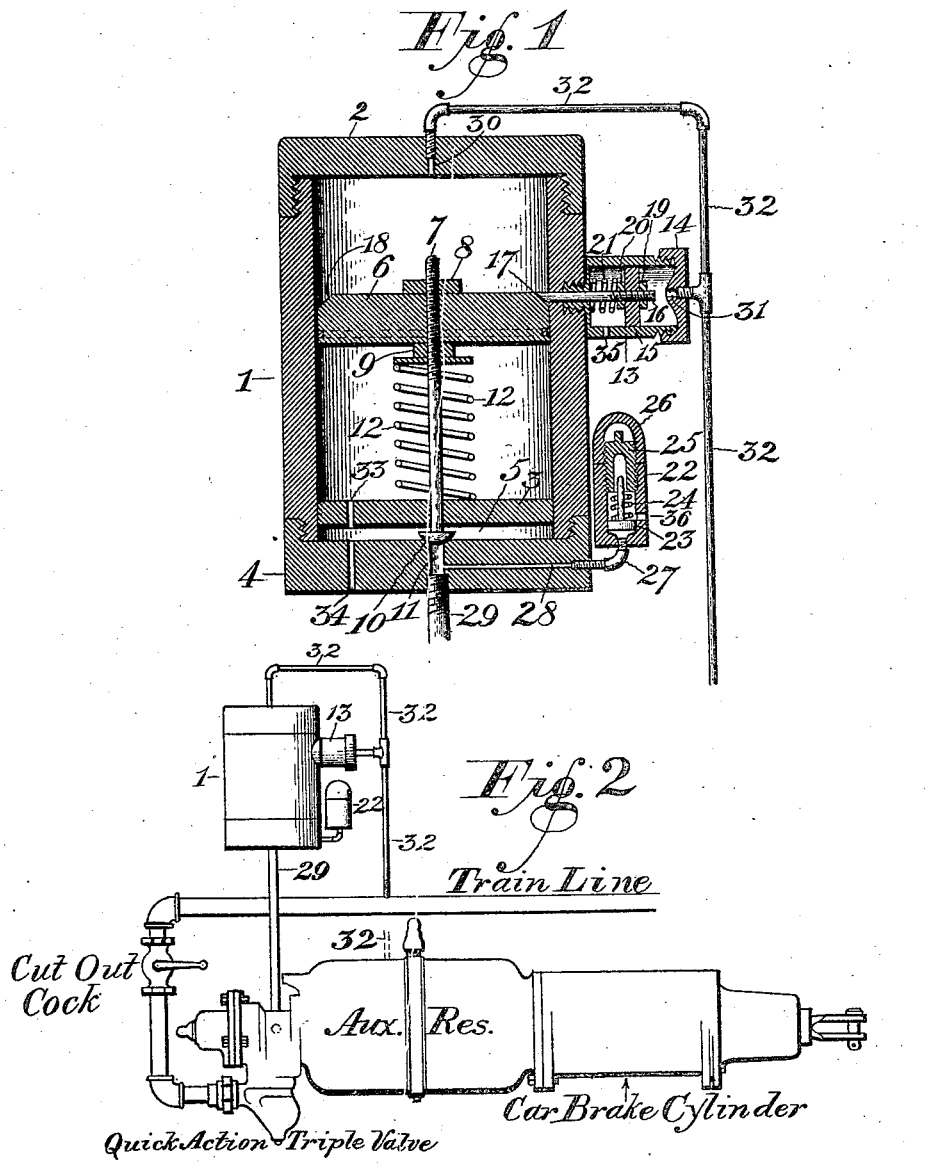

ABRAHAM YOUNG, OF MONTEVIDEO, MINNESOTA.

AIR-BRAKE PRESSURE RETAINER.

1,421,651.

Specification of Letters Patent. Patented July 4, 1922.

Application filed October 23, 1920. Serial No. 418,952.

*To all whom it may concern:*

Be it known that I, ABRAHAM YOUNG, a citizen of the United States, residing at Montevideo, in the county of Chippewa and State of Minnesota, have invented certain new and useful Improvements in Air-Brake Pressure Retainers, of which the following is a specification.

My invention relates to pressure retainers for air brakes. My object is to provide a device adapted to be connected with an air brake for retaining brake-cylinder pressure while recharging the train line and auxiliary reservoirs.

A more specific object in view is to provide an accessory for an air brake by means of which the air brake mechanism is at all times under the complete control of the engineer. This includes means for retaining a predetermined given pressure (usually 15 pounds) in the brake-cylinder while recharging the train line.

Another specific object is to provide supplementary mechanism for an air brake system, whereby the entire system is controlled from the engine by simply increasing or decreasing the pressure in the train line.

Other objects will appear in the subjoined description.

A leading feature of the invention consists in a chamber having a valved outlet leading from the exhaust port of the triple valve through said chamber to the open air, whereby to prevent the escape of air from the brake cylinder while the tripple valve is in release position—the position it occupies when the train line is in open communication with the main reservoir to be recharged therefrom—said chamber being also connected with the train line or one of the auxiliary reservoirs and provided with means for controlling said valved outlet by varying the pressure in said train line or auxiliary reservoir; said valved outlet-opening having a by-pass adapted, when the outlet is closed by the valve, to, nevertheless, permit the escape of all air in the brake cylinder above a predetermined pressure.

The invention consists in certain novel features of construction and arrangement of parts, as will be hereinafter described and claimed, reference being had to the accompanying drawings, in which, Fig. 1 shows a sectional view of my improved air brake attachment, and Fig. 2 is a diagrammatic view showing the same connected with an air brake system.

My device is composed of a main cylinder 1 having a cap 2; double bottoms 3 and 4 with a space 5 between them; a piston 6 carrying a stem 7 rigidly secured thereto by means of nuts 8 and 9 on either side of the piston. The stem 7 extends downwardly through a suitable bore in the upper bottom 3 and is provided on its lower end with a valve 10. The lower bottom 4 has a central opening 11 provided at its upper end with a ground seat for the valve 10. A spring 12 is interposed between the piston 6 and the upper bottom 3 to normally force the piston upwardly to unseat the valve 10.

The main cylinder 1 is provided on one side with a small horizontal cylinder 13 having a cap 14 and a piston 15 carrying a locking stem 16 provided at its inner end with a bevel 17 adapted to engage the peripheral bevel 18 on the upper side of the piston 6 of the main cylinder. The stem 16 is rigidly secured to the piston 15 by two nuts 19 and 20, one on either side of said piston. A compression spring 21 is interposed between the piston 15 and the bottom of the cylinder 13 to normally press said piston 15 with its stem 16 outwardly to withdraw the beveled end 17 of the stem out of the path of the piston 6 of the main cylinder 1, to permit said piston 6 to be moved upwardly by the compression of the spring 12, whereby to unseat the valve 10 at the lower end of the stem 7 carried by said piston 6.

The main cylinder 1 is also provided near its lower end with a small cylinder 22 having a valve 23 seating therein, said valve being pressed into engagement with its seat by a spring 24. The upper end of this cylinder 22 is provided with a screw plug 25 for regulating the pressure on the spring 24; and the upper end of the screw plug 25 carries a threaded cap 26 which serves as a lock nut for said adjusting plug. The small cylinder 1 is also provided in its bottom with an opening underneath the spring-pressed valve 23, said opening carrying a bent joint of pipe 27 by means of which the small cylinder 22 is secured to the lower bottom 4 of the main cylinder at the outer end of the horizontal bore 28 which leads outwardly from the central bore 11 of said bottom. A pipe 29 extends downwardly from the opening 11 in the lower bottom 4 of the main cylinder 1 and connects said opening with the exhaust of the triple valve. The cylinder 1 is provided in its cap 2 at its upper end with an opening 30, and the small cylinder 13 is provided in its cap 14 with an opening 31, and these two openings are connected with each other and with the train line or auxiliary by means of the pipe 32 which has suitable threaded engagement with both of said openings.

In Fig. 2 of the drawings, the pipe 32 is shown in full lines as connected with the train line, and in dotted lines as connected with the auxiliary reservoir, since in practice it may be connected with whichever one of these is desired.

The two bottoms 3 and 4 of the main cylinder are provided with the small alined bores 33 and 34 respectively, leading from the lower interior portion of the cylinder to the outer air. The small cylinders 13 and 22 are also provided with bores 36 and 37 respectively, leading to the outer air.

In describing the operation of my device. I will suppose that it is being used with an air brake system in which the train line may be easily supplied with an air pressure of 90 pounds or more from the main reservoir which is directly connected with the air compressor on the locomotive.

I will next suppose that it is desired to put my improved retainer in position to retain a given pressure (say 15 pounds) in the brake cylinders while recharging the train line and auxiliaries. Under these conditions the spring 12 in the main cylinder will be adjusted to resist an air pressure on the piston 6 of not over 89 pounds. Then when the pressure in the train line and auxiliaries is increased appreciably above 89 pounds, the air flowing from the pipe 32 into the upper end of the main cylinder will force the piston 6 downwardly against the action of the spring 12 till the valve 10 is firmly pressed upon its ground seat at the upper end of the opening 11, thus closing the exhaust outlet from the triple, which exhaust normally passes up through the pipe 29 and the opening 11 and on out through the bore 34 to the open air. At the same time the air pressure from the train line and auxiliaries will pass from the pipe 32 into the small cylinder 13 and depress the piston 15 thereof against the resistance of the spring 21 which is adjusted to resist a less air pressure than that normally employed in the train line when the train is running on level track and the brakes are idle: Or to be more specific, let us suppose that the train is running on level track, the reducer is set to hold the train line pressure at 70 pounds. Then the spring 21 should be adjusted to resist an air pressure on the piston 15 of materially less than 70 pounds, or say 62½ pounds, which is the pressure of air equalizer in train line, auxiliaries, and cylinder, with 90 pounds train line pressure. Under these conditions, when 90 or more pounds of air pressure is turned into the upper end of the main cylinder thereby compressing the spring 12 till the valve 10 is firmly seated, the air pressure in the locking cylinder 13 will force the stem 16 inwardly causing the inner beveled end 17 thereof to engage the peripheral bevel 18 on the upper side of the piston 6, thereby holding said piston 6 locked in its downward position with the valve 10 firmly pressed upon its ground seat to keep the exhaust-outlet from the triple closed.

With the air brake as now employed, when the train line and auxiliaries are thrown into direct communication with the main reservoir to be recharged therefrom, the handle of the brake valve is put in full release position, which will result in forcing the pistons of the triple to release position and opening the port from the brake cylinder through the triple to the exhaust port of the triple, so that all the air from the brake cylinders will escape, thereby releasing the brakes: But with my arrangement the air from the brake cylinders cannot escape because the outlet from the triple exhaust is closed by the valve 10 which is now firmly held upon its seat and locked in that position by the beveled inner end of the locking stem 16. However, with that arrangement only, too much pressure would, of course, be retained in the brake cylinders, and for that reason I have provided the by-pass 28 leading out from the opening 11 at a point between the triple exhaust and the valve 10 to the under side of the piston 23 of the small cylinder 22. The spring 24 which presses the piston 23 is adjusted to resist an air pressure of only 15 pounds, so that when there is a greater pressure than that in the by-pass 28 the piston 23 will rise and permit the excess of air above 15 pounds to escape through the small bore 36 to the open air. Hence the pressure in the brake cylinders will not be permitted to remain above 15 pounds while the valve 10 is seated and the train line is being recharged. As soon however, as the brake cylinder pressure falls below 15 pounds, the piston 23 will be pressed downwardly by the spring 24 and close the outlet 36 to prevent further lowering of the pressure.

When it is desired that all the air shall escape from the brake cylinders in order to release the brakes, the pressure in the train line and auxiliaries is reduced below 62½ pounds, whereupon the spring 21 will force the piston 15 of the locking cylinder outwardly together with its stem 16, thus releasing the piston 6 of the main cylinder and permitting the spring 12 to move the same upwardly to unseat the valve 10 and permit air to escape through the opening 11 and thence through the small bore 34 to the atmosphere.

When the retainers have been released it is only necessary to turn the feed valve of the air brake back to the position where it delivers the normal train line pressure of 70 pounds and reduce train line accordingly as in an overcharge.

The ports 34 and 35 of the main cylinder and the locking cylinder respectively, permit leakage to flow to the atmosphere to prevent the same from interfering with the proper working of the pistons.

Thus it will be seen that I have provided an accessory for air brakes whereby the brakes throughout a train of cars may be entirely controlled from the engine by simply increasing or decreasing the train line pressure, as occasion may require.

The springs 12, 21 and 24 are adjustable and may be set at different tensions or pressures, as the rules on different roads may require.

Having thus described my invention, what I claim as new and desire to protect by Letters Patent is:—

1. The combination with an air brake having an exhaust port, of a primary and a secondary closure for said port, the secondary closure being operated in one direction by air pressure and in the opposite direction by spring pressure; means under the control of the operator for operating said secondary closure independently of the primary closure, whereby the escape of air from said exhaust port may be prevented when the primary closure is open; and means interposed between said closures for the escape of air above a given pressure.

2. The combination with an air brake having an exhaust port with a passage leading therefrom to the open air; a valve in said passage for opening and closing the same to control the flow of air from the exhaust port when said port is open; means interposed between said port and valve for the escape of air above a given pressure when the valve is closed; and means for utilizing the train line or auxiliary pressure to close said valve.

3. The combination with an air brake having an exhaust port with a passage leading therefrom to the open air; a valve in said passage for opening and closing the same to control the flow of air from the exhaust port when said port is open; means interposed between said port and valve for the escape of air above a given pressure; and means independently of the brake cylinder pressure for operating said valve by varying the air pressure in the train line.

4. A pressure retainer for air brakes, comprising a retainer cylinder having a chamber therein in communication with the outer air; a passageway leading from the exhaust port of the air brake into said chamber; a valve for controlling the passage of air through said passageway; a piston in said chamber connected with said valve and movable back and forth to open and close the valve; a locking cylinder connected with said retainer cylinder and having a piston movable back and forth carrying a locking stem for engaging and locking the piston of the retainer cylinder when it has moved into position to close the valve carried thereby; a pipe leading from the train line into the head end of each of said cylinders to introduce train line or auxiliary pressure thereinto, the pistons in said cylinders being movable inwardly by said air pressure, each of said pistons being provided with a spring for resisting said inward movement, the spring in the retainer cylinder being adapted to overcome a greater air pressure than the spring in the locking cylinder; said retainer cylinder having a bore extending inwardly from its outer side and tapping said valved passageway that leads from the exhaust port of the air brake into the retainer cylinder, to form a by-path for the escape of air from said passageway when the exhaust port of the triple at one end thereof is open and the valve at the other end thereof closed; and a spring-pressed valve at the outer end of said by-path for holding the same normally closed to only permit the escape therethrough of air above a given pressure, the spring pressing said valve being adjusted to yield to a less air pressure than the springs in the retaining cylinder or the locking cylinder.

5. A pressure retainer for air brakes, comprising a retainer cylinder having a chamber therein in communication with the outer air; a passageway leading from the exhaust port of the air brake into said chamber; a valve for controlling the passage of air through said passageway; a piston in said chamber connected with said valve and movable back and forth to open and close the valve; a locking cylinder connected with said retainer cylinder and having a piston movable back and forth carrying a locking stem for engaging and locking the piston of the retainer cylinder when it has moved into position to close the valve carried thereby; a pipe leading from the train line or auxiliary into the head end of each of said cylinders to introduce train line pressure thereinto, the pistons in said cylinders being movable inwardly by said air pressure, each of said pistons being provided with a spring for resisting its inward movement; said retainer cylinder having a bore extending inwardly from its outer side and tapping said valved passageway to form a by-path for the escape of air therefrom when the exhaust port of the triple at one end thereof is open and the valve at the other end thereof closed; a spring-pressed valve at the outer end of said by-path for holding the same normally closed to only permit the escape therethrough of air above a given pressure, the spring in the retainer cylinder being adapted to overcome a greater air pressure than the normal pressure of the train line when the train is running on level track with the brakes idle, the spring in the locking cylinder being adapted to be overcome by a less pressure than said normal train line pressure, and the spring pressure on the valve at the outlet of the by-path being adapted to be overcome by an air pressure still less than that required to overcome the pressure of the spring in the locking cylinder.

6. The combination with an air brake, of means under the control of the operator of the air brake for utilizing the train-line pressure independently of the brake cylinder pressure to cut off the flow of air, below a given pressure, from the brake cylinder through the exhaust port of the triple while the train line with its auxiliary reservoirs is being recharged.

7. The combination with an air brake, of means under the control of the operator for utilizing train line or auxiliary pressure greater than the normal to cut off the flow of air, below a given pressure, from the brake cylinder through the open exhaust port of the air brake triple while the train line is being recharged, whereby to retain a given pressure in the brake cylinders during said recharging operation; and additional means for locking said first named means in position to perform the operation just described within certain limits of train-line pressure ranging down to a given point below the normal, said latter means being adapted at that point to unlock and release said first named means, to give the air from the brake cylinder free passage through said open exhaust port of the triple, whereby to fully release the brakes.

8. The combination with an air brake having an exhaust port leading to the outer air, of a primary and a secondary closure for said port, the secondary closure being operated in one direction by air pressure and in the opposite direction by spring pressure only, and means under the control of the operator for utilizing the train line pressure to move said secondary closure independently of the primary closure into position to close said exhaust port.

9. The combination with an air brake having an exhaust port with a passage leading therefrom to the open air; a valve in said passage for opening and closing the same to control the flow of air from the exhaust port when said port is open; a spring for pressing the valve in a direction to open the same; means interposed between said port and valve for the escape of air above a given pressure; and means for utilizing the train line or auxiliary pressure to resist the action of said spring and thereby close the valve.

10. The combination with an air brake having an exhaust port, of a primary and a secondary closure for said port; a spring for pressing said secondary closure to its open position; and means under the control of the operator for closing said secondary closure against the resistance of the spring while the primary closure is open, whereby the escape of air from said exhaust port may be prevented when the primary closure is open; and means interposed between said closures for the escape of air above a given pressure.

11. The combination with an air brake having an exhaust port, of a primary and a secondary closure for said port, the primary closure being operated in both directions by air pressure, and the secondary closure being operated in one direction by air pressure and in the opposite direction by spring pressure; means under the control of the operator for closing said secondary closure while the primary closure is open, whereby the escape of air from said exhaust port may be prevented while the primary closure is open; and means interposed between said closures for the escape of air above a given pressure.

12. The combination with an air brake of means under the control of the operator for cutting off the flow of air below a given pressure from the brake cylinder through the open exhaust port of the triple valve while the train line with its auxiliary reservoirs is being recharged, said means including a valve moved in one direction by means independent of air pressure and moved in the other direction by air-brake pressure.

13. The combination with an air-brake having an exhaust port, of a primary and a secondary closure for said port, the secondary closure being pressed in one direction by air only, and in the opposite direction by spring pressure only; and means under the control of the operator for utilizing the train-line pressure to move said secondary closure independently of the primary closure into position to close said exhaust port.

In testimony whereof I affix my signature.

ABRAHAM YOUNG.